US010708870B2

(12) United States Patent
Doubek et al.

(10) Patent No.: US 10,708,870 B2
(45) Date of Patent: Jul. 7, 2020

(54) SYSTEMS AND METHODS FOR ADJUSTING POWER SETTINGS OF A WIRELESS DEVICE

(71) Applicant: Control4 Corporation, Salt Lake City, UT (US)

(72) Inventors: Joseph Doubek, Salt Lake City, UT (US); Robert Don Bruhn, Jr., Salt Lake City, UT (US); Luis F. Gomez, Salt Lake City, UT (US)

(73) Assignee: WirePath Home Systems, LLC, Salt Lake City, UT (US)

( * ) Notice: Subject to any disclaimer, the term of this patent is extended or adjusted under 35 U.S.C. 154(b) by 190 days.

(21) Appl. No.: 13/870,657

(22) Filed: Apr. 25, 2013

(65) Prior Publication Data

US 2014/0323108 A1   Oct. 30, 2014

(51) Int. Cl.
*H04W 52/28* (2009.01)
*H04W 64/00* (2009.01)
*H04W 52/36* (2009.01)
*H04W 52/14* (2009.01)

(52) U.S. Cl.
CPC ....... *H04W 52/283* (2013.01); *H04W 52/367* (2013.01); *H04W 64/00* (2013.01); *H04W 52/146* (2013.01)

(58) Field of Classification Search
CPC . H04W 52/283; H04W 52/367; H04W 64/00; H04W 52/146

USPC ........ 455/418–420, 13.4, 522, 456.1–3, 574, 455/343.2; 370/318, 338; 340/7.32, 340/7.33, 7.36
See application file for complete search history.

(56) References Cited

U.S. PATENT DOCUMENTS

| | | | |
|---|---|---|---|
| 6,885,337 B2 * | 4/2005 | Jendbro ................. | G01S 19/05 342/357.4 |
| 8,155,649 B2 * | 4/2012 | McHenry et al. ............ | 455/434 |
| 8,712,440 B2 * | 4/2014 | Moeglein et al. ......... | 455/456.3 |
| 9,374,160 B2 * | 6/2016 | Park ................... | H04B 10/1149 |
| 9,412,266 B2 * | 8/2016 | Chen ..................... | G08C 19/16 |
| 2004/0214539 A1 * | 10/2004 | Rajamani .............. | H04W 48/18 455/161.1 |
| 2006/0116179 A1 * | 6/2006 | Vensuna ....................... | 455/574 |
| 2007/0237121 A1 * | 10/2007 | Khandelwal et al. ........ | 370/338 |
| 2010/0128709 A1 * | 5/2010 | Liu et al. ....................... | 370/338 |
| 2011/0136493 A1 * | 6/2011 | Dimpflmaier et al. ....... | 455/450 |
| 2013/0159153 A1 * | 6/2013 | Lau ......................... | G06Q 10/06 705/34 |
| 2013/0267237 A1 * | 10/2013 | Kim et al. ..................... | 455/450 |
| 2014/0269658 A1 * | 9/2014 | Sadasivam ........ | H04W 72/0406 370/338 |

* cited by examiner

*Primary Examiner* — Marcos L Torres
(74) *Attorney, Agent, or Firm* — Austin Rapp (57) ABSTRACT

A method of adjusting power settings on a wireless device is described. The method includes applying a default power setting. The method also includes receiving region information from a central configuration device. The method also includes determining a power setting based on the region information. The method also includes applying the power setting.

13 Claims, 8 Drawing Sheets

SYSTEMS AND METHODS FOR ADJUSTING POWER SETTINGS OF A WIRELESS DEVICE

TECHNICAL FIELD

The present disclosure relates generally to wireless devices. More specifically, the present disclosure relates to systems and methods for adjusting power of a wireless device.

BACKGROUND

In recent years, the use of wireless devices has become more widespread. In addition, the size of wireless devices has continued to decrease. With the increase of availability and the decrease in size, wireless devices have become more mobile and may be operated across multiple regions.

The increased availability of wireless devices and wireless communication has permitted communication between wireless devices across multiple regions and countries. Further, the increased mobility enables wireless devices to be used in the home, at businesses or when traveling between various regions and countries.

With the increased mobility and movement of wireless devices, compatibility of mobile devices with wireless networks has become a concern. In particular, a wireless device having certain specifications and settings may perform differently in one network than another network.

With more and more wireless devices being used across multiple regions and countries, improved compatibility features are needed. As illustrated in this discussion, improved systems and methods for managing power of a device may be beneficial.

DETAILED DESCRIPTION

A method of adjusting power settings on a wireless device is described. The method includes applying a default power setting. The method also includes receiving region information from a central configuration device. The method also includes determining a power setting based on the region information. The method also includes applying the power setting.

The default power setting may be a lowest allowed power setting. The region information may include latitude information and longitude information. The region information may also include a country code. The region information may correspond to a region in which the wireless device is operating.

The method may include transmitting a discovery request to join a wireless network. The method may also include joining a wireless network corresponding to the region information. The region information may also be received in a broadcast from the central configuration device. The wireless device may join a wireless network corresponding to the region information before applying the power setting. The wireless device may join a wireless network corresponding to the region information after applying the power setting.

The wireless device may include a list of prepopulated power settings. The wireless device may also include region information corresponding to each power setting on the list of prepopulated power settings. The wireless device may also include region information corresponding to a range of power settings. Determining the power setting may include comparing the received region information to the list of prepopulated power settings. Determining the power setting may also include determining a power setting from the list of prepopulated power settings based on the received region information.

A wireless device for adjusting power settings is also described. The wireless device may include a processor and memory in electronic communication with the processor. The wireless device may also include instructions stored in memory. The instruction may be executable to apply a default power setting. The instructions may also be executable to receive region information from a central configuration device. The instructions may also be executable to determine a power setting based on the region information. The instructions may also be executable to apply the power setting.

A non-transitory tangible computer-readable medium for adjusting power settings is also described. The computer-readable medium may include executable instructions for applying a default power setting. The computer-readable medium may also include executable instructions for receiving region information from a central configuration device. The computer-readable medium may also include executable instructions for determining a power setting based on the region information. The computer-readable medium may also include executable instructions for applying the power setting.

Power settings of a wireless device may vary from region to region. Further, varying power settings may be due to different regulatory requirements in different regions. Optimal performance of a wireless device may require operating at a different power setting based on the region in which the wireless device is operating. While power settings may be adjusted and measured during compliance testing and/or during manufacturing for distribution into a specific locale or region, power settings may also be adjusted manually or automatically after distribution. Thus, optimal performance of a wireless device may be accomplished by configuring power (e.g., radio power) and other settings based on the region in which the wireless device is operating. Adjusting power settings of a wireless device may be performed before, during or after joining a network. As used herein, power settings may refer to radio power settings, power specifications of a device and/or any setting or specification of a device (e.g., wireless device) affecting transmitted power.

In facilitating optimal performance of a wireless device, the wireless device may be prepopulated with appropriate power settings for various regions. For example, a wireless device may include a stored list of prepopulated power settings and corresponding regions in which those power settings may be applied. Various regions and associated power requirements may also correspond to various ranges of power settings that may be used to achieve optimum performance for a particular wireless device. The wireless device may receive information from a region-aware central device (e.g., central configuration device) indicating a region in which the wireless device is operating. Based on information received, the wireless device may determine a power setting to be applied to the wireless device for optimum performance and/or for complying with region-specific regulatory requirements. In other words, to obtain optimal radio performance, a device may be configured for region-specific compliant radio power settings based upon discovery of the location information for a given region before or during a network joining procedure.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods. As used herein, the term "plurality" may indicate two or more. For example, a plurality of components refers to two or more components.

Figure 1:
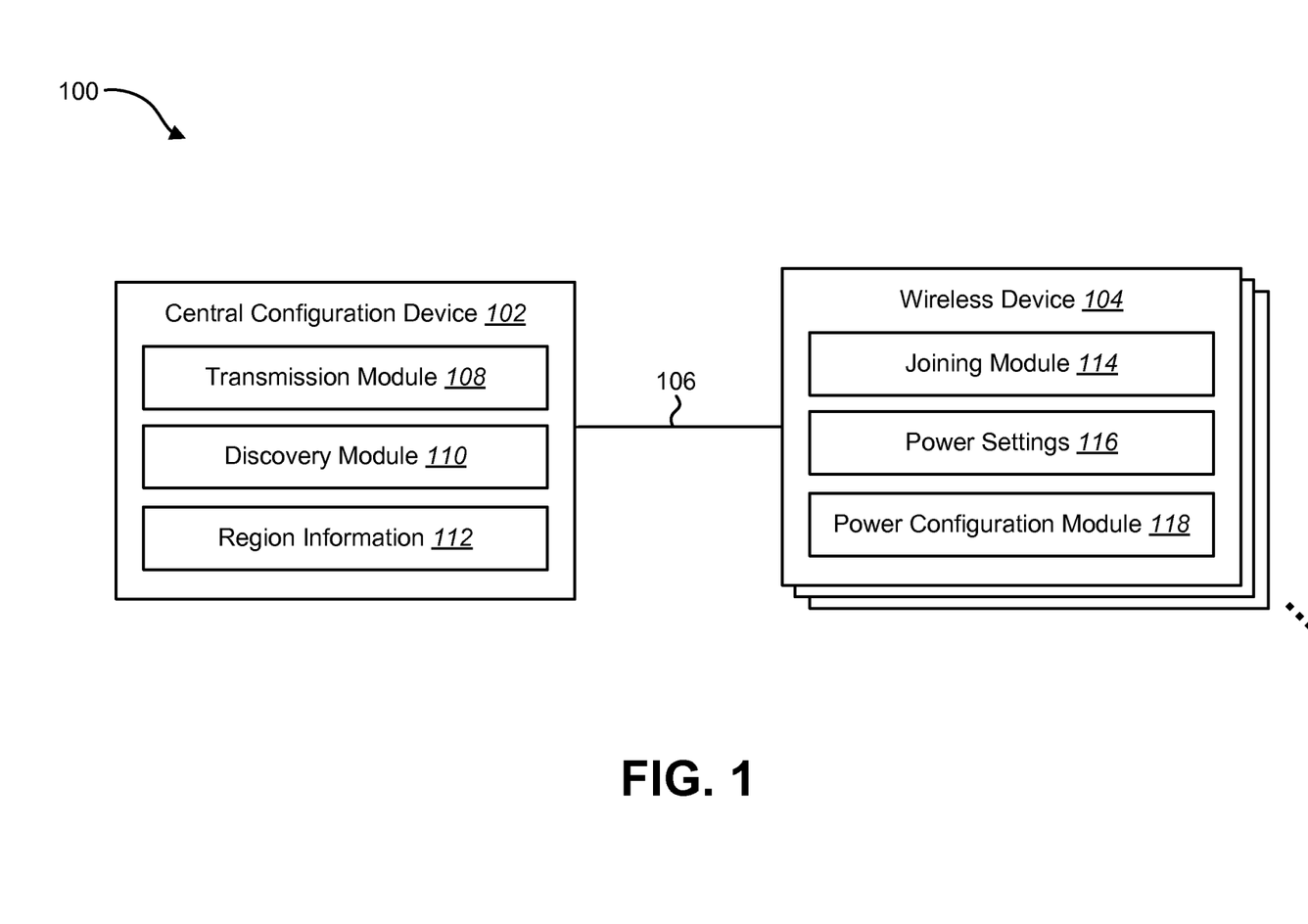
FIG. 1 is a block diagram illustrating one configuration of system for adjusting a power setting of a wireless device based on region information.

FIG. 1 is a block diagram illustrating one configuration of system 100 for adjusting a power setting 116 of a wireless device 104 based on region information. The system 100 may include one or more wireless devices 104 and a central configuration device 102. Examples of wireless devices 104 may include various types of electronic devices, including appliances, lighting controls, dimmers, switches, thermostats, security systems, sound systems, audio devices, video devices, entertainment systems, smart phones, tablet devices, personal digital assistants (PDAs), modems, handheld devices, cellular phones, servers, personal computers (PCs), laptop computers, tablet devices, computing devices, radio devices or other types of wireless devices capable of transmitting or receiving wireless communications and/or joining a network.

A wireless device 104 may include a joining module 114. The joining module 114 may be a hardware and/or software module used to facilitate the wireless device 104 joining a network. The joining module 114 may include functionality for communicating with a central configuration device 102 and obtaining region information 112 about a network and/or region in which the wireless device 104 is operating. In one configuration, the wireless device 104 may have joined a network in the region, and the joining module 114 may be used to request region information specific to the region or network that the wireless device 104 has joined. In another configuration, the wireless device 104 may be operating in a region, but has not joined the network. In this case, the joining module 114 may be used for obtaining region information 112 prior to joining the network.

The joining module 114 may be used for receiving region information 112 about a network from the central configuration device 102. In some configurations, the region information 112 may be received in a broadcast from the central configuration device 102 to multiple wireless devices 104 in the region. For example, the broadcast may include a region code defined by the locale of the central configuration device 102. The region code may include mapping to a region, determined through a lookup table of a location. The region may be determined through latitude/longitude, country code, zip code or other criteria. The region code may allow a specific enumerated region value to map to a variety of localization methods (e.g., latitude/longitude, country code, etc.) The region information 112 may be received without a request from the wireless device 104. Alternatively, the region information 112 may be received in response to the wireless device 104 beginning a network join procedure in the region. For example, the joining module 114 may be used to send a discovery request to join a network. The joining module 114 may send the discovery request to a central configuration device 102 to request access to a network and/or the central configuration device 102 may send region information 112 about a network prior to the wireless device 104 joining the network. For example, where the central configuration device 102 sends region information 112 prior to a wireless device 104 joining the network, the region information 112 may be received by all wireless devices within range of the central configuration device 102 and an appropriate radio configuration may be applied based on lookup of the region code, which may occur upon receiving the region information 112 including the region code. The joining module 114 may then be used to join the network. Joining the network may occur before, during or after receiving region information 112 from the central configuration device 102.

The wireless device 104 may also include power settings 116. Power settings 116 may be a maximum power in which the wireless device 104 operates. Thus, settings a wireless device 104 to a power setting 116 may include setting a maximum power (e.g., transmit power, radio power) that the wireless device 104 may use when operating or transmitting data. Further, while a power setting 116 may establish a maximum power, a wireless device 104 may back off the maximum power established by the power setting 116 for various considerations (e.g., optimizing power efficiencies, saving power). Additionally or alternatively, a power setting 116 may be a specific power level, such as the case when a wireless device 104 joins a network and is then set to a specific level. A power setting 116 may also be determined by a region code that is translated by the wireless device 104 to reflect a power level on a device-by-device basis. For example, where a region code is received via a broadcast, each wireless device 104 within range of the broadcast may each individually apply a power setting 116 based upon the region code. The power settings 116 may be stored and implemented on the wireless device 104. For example, the power settings 116 may include a list of prepopulated power settings 116 that may be used by the wireless device 104. Each of the power settings 116 may include power specifications or measurements that may adjust or modify the transmission power or other power-related performance of the wireless device 104. Examples of power settings 116 may also include transmission settings, radio power settings or other settings of the wireless device 104 that affect the power performance (e.g., transmit power) of the wireless device 104 when operating. The power settings 116 may include radio power settings and other settings that may be modified based on a region in which the wireless device 104 is operating. A power setting 116 or range of power settings

116 may be selected by the wireless device 104 based on region information 112 received from the central configuration device 102.

In one example, each power setting 116 of the stored power settings 116 may correspond to region information. Region information corresponding to each power setting 116 may be stored with the power settings 116 on the wireless device 104. The power settings 116 may include a prepopulated list of power settings 116 and/or a list of ranges of power settings 116 that may be used by the wireless device 104 for each respective region. Each power setting 116 or range of power settings 116 in the list of power settings 116 may correspond to region information stored on the wireless device 104. The power settings 116 may also include a default power setting that is applied whenever the wireless device 104 initiates operation or whenever a wireless device 104 enters a region or joins a network. The default power setting may be the lowest allowed power setting 116 (e.g., lowest transmit power setting) of the wireless device 104.

The wireless device 104 may include a power configuration module 118. The power configuration module 118 may be a hardware and/or software module for configuring and/or implementing one or more power settings 116 on the wireless device 104. The power configuration module 118 may be used to initially apply a default power setting to the wireless device 104. The power configuration module 118 may also determine a power setting 116 for the wireless device 104 based on region information 112 received from the central configuration device 102. Determining a power setting 116 may include selecting a power setting 116 from the stored power settings 116 based on the received region information 112. The power configuration module 118 may apply the selected power setting 116. In some configurations, the power configuration module 118 may select a range of power settings 116 applicable to received region information 112 and determine an optimal power setting 116 (e.g., a power setting that meets one or more requirements for a region) from the selected range of power settings 116. In other words, where more than one power setting 116 may be used for a particular region, the wireless device 104 may select one of several viable power settings 116 to apply on the wireless device 104. In another configuration, the wireless device 104 may not include an exact power setting 116 corresponding to the power settings 116 associated with a particular region or the regulatory requirements of a region. In this case, the wireless device 104 may select the closest power setting 116 or, alternatively, a lower power setting 116 than the regulated power setting 116 for the region. In some configurations, where a power setting 116 for a corresponding region does not exist, the wireless device 104 may operate according to the default power setting of the wireless device 104.

The system 100 may also include a central configuration device 102. The central configuration device 102 may be a central device within a similar region as one or more wireless devices 104. Examples of the central configuration device 102 include controllers (e.g., home automation controllers), base stations, access points, routers, servers, computers, entertainment systems, etc. For instance, the central configuration device 102 may be central controller for serving one or more wireless devices 104 or nodes in a network (e.g., LAN, mesh network). Further, the central configuration device may be any device that manages and/or routes one or more nodes in a network (e.g., wireless network). The central configuration device 102 may communicate with one or more wireless devices 104 over a network. The central configuration device 102 may provide communication coverage for a number of wireless devices 104 within a particular region. In another configuration, the central configuration device 102 may be a central device (e.g., controller) of a smaller network, such as a local area network (LAN) or other network in which the wireless device 104 operates. Communication between the central configuration device 102 and one or more wireless devices 104 may be over a wireless or wired network.

The central configuration device 102 may include a transmission module 108. The transmission module 108 may be a hardware and/or software module for transmitting and/or receiving communications between the central configuration device 102 and one or more wireless devices 104. For example, the transmission module 108 may be used to send region information 112 to a wireless device 104. In some configurations, the transmission module 108 may be used to broadcast region information 112 to one or more wireless devices 104. In some configurations, broadcasting region information 112 may be performed without receiving a request from one or more wireless devices 104. For example, the transmission module 108 may periodically broadcast region information 112 to any wireless device 104 within range of the central configuration device 102. Further, the broadcast may be received passively by the wireless device 104. In this case where a broadcast is sent and received (e.g., in a passive mode), the broadcast may be sent on a regular interval to any wireless device 104 within range of the central configuration device 102. One or more wireless devices 104 may automatically self-configure power settings 116 to the correct region based on the region information 112 sent from the central configuration device 102. In another configuration, transmission or broadcasting region information 112 may be performed at the request of a wireless device 104 or upon detecting a wireless device 104 requesting access to a network. In yet another configuration, the transmission module 108 may specifically transmit region information 112 to the wireless device 104 in response to receiving a discovery request from the wireless device 104 to join a network. Transmitting or broadcasting region information 112 may be performed before or after a wireless device 104 joins a network.

The central configuration device 102 may also include a discovery module 110. The discovery module 110 may be a hardware and/or software module for facilitating discovery of a wireless device 104 on a network. The discovery module 110 may detect a discovery request from the wireless device 104. In one configuration, the central configuration device 102 may receive the discovery request from the wireless device 104 to join a wireless network served by the central configuration device 102. In another configuration, the central configuration device 102 may receive a notification of the wireless device 104 sending a discovery request to join a network. Examples of networks and communication technology that may be used when joining a network via a discovery request may include ZigBee®, WiMax®, WiFi®, Bluetooth®, Z-wave and/or cellular protocols, such as GSM®, etc. The discovery module 110 may receive the discovery request and provide region information 112 corresponding to a region in which the central configuration device 102 and/or the wireless device 104 are operating. For example, the discovery module 110 may be used to instruct the central configuration device 102 to prepare and/or send region information 112 to the wireless device 104 corresponding to a region in which the wireless device 104 is operating. In another configuration, the discovery module 110 may be used to assist the wireless device 104 in joining a network before the central configuration device 102 sends region information 112 to the wireless device 104. Further, each wireless device 106 may be subject to the same regulatory requirements (e.g., maximum transmit power) during joining and normal operations. Also, the maximum allowed power (e.g., output power) may vary depending on the region.

The central configuration device 102 may also include region information 112. In some configurations, the region information 112 may include latitude information and/or longitude information. The latitude information and longitude information may be set on the central configuration device 102. In some configurations, the wireless device 106 may have limited range and the central configuration device 102 may be associated with the same geographic location (e.g., latitude/longitude) as the wireless devices 106. The latitude information and longitude information may be a range of latitude and longitude. Additionally or alternatively, the region information 112 may include one or more country codes or area codes applicable to a region in which one or more wireless devices 104 may be operating. The region information 112 may also correspond to a geographic location of the central configuration device 102. Region information 112 may also correspond to a region served by the central configuration device (e.g., a base station and/or a specific wireless network). The region may be specific to an area served by the wireless network. For example, the region may be specific to an area, city, state, country or continent in which the wireless device 104 and/or central configuration device 102 are operating. Any of the region information 112, including the latitude/longitude, country code, zip code and/or address may be used by the central configuration device 102 to determine a location or region. In one configuration, a lookup may be performed on the central configuration device 102 and information may be transmitted to the wireless device 104 indicating the correct radio power based upon this lookup. In another configuration, a lookup may result in a region code value that covers an entire region, which may be included in the region information 112 sent to the wireless device 104. The wireless device 104 may look up an appropriate power setting 116 (e.g., radio power setting) for that particular region. The region associated with the power setting 116 may cover a range of latitude information and longitude information, zip codes, country codes, or other region information 112.

The central configuration device 102 and one or more wireless devices 104 may communicate using a communication link 106. The communication link 106 may be any link that may be used for communication between a central configuration device 102 and one or more wireless devices 104. For example, a communication link 106 may be a direct connection between the central configuration device 102 and a wireless device 104. In another configuration, the communication link 106 may include a network over which the central configuration device 102 communicates with one or more wireless devices 104. Examples of networks that may be used in connection with the communication link 106 include computer networks such as a local area networks (LANs), wide area networks (WANs), the Public Switched Telephone Network (PSTN), cellular phone networks, the Internet, intranets or other mediums that may be used for transferring data between the central configuration device 102 and one or more wireless devices 104. Where the central configuration device 102 is a base station, the communication link 106 may include a wireless network associated with the region in which the wireless device 104 is operating.

A variety of different power settings 116 may be stored on the wireless device 116 for adjusting a power setting 116 of a wireless device 104 based on region information 112. These power settings 116 may include a prepopulated list of power settings 116 or ranges of power settings 116 that are associated with one or more regions. The stored power settings 116 may include or be based on transmitted power regulations, requirements, specifications, electromagnetic (EM) levels or other power specifications that may be used when operating the wireless device 104. The power settings 116 may be stored on the wireless device 104 at any time. For example, power settings 116 may be stored on the wireless device during testing and manufacturing of the wireless device 104. Power settings 116 may also be downloaded, manually added or stored on the wireless device 104 after the wireless device 104 has been distributed or as various power settings 116 and regulatory requirements or region information becomes available.

The wireless device 104 may initially apply a default power setting. For example, when the wireless device 104 is turned on, the wireless device 104 may automatically default to the lowest allowed power setting 116 for the wireless device 104. In one configuration, the central configuration device 102 is aware of a region in which the wireless device 104 is operating and may transmit region information 112 to the wireless device 104. As stated above, the region information 112 may be received by a wireless device 104 via broadcast or specific transmission. Further, the region information 112 may be received either passively or in response to a discovery request. Further, the wireless device 104 may receive the region information 112 before, during or after joining a network.

The wireless device 104 may determine (e.g., select, obtain, etc.) one or more power settings 116 stored on the wireless device 104 based on the region information 112 received from the central configuration device 102. Each of the stored power settings 116 may be associated with one or more specific regions when the power settings 116 are stored on the wireless device 104. Thus, the wireless device 104 may compare the received region information 112 from the central configuration device 102 to the region information associated with each of the power settings 116. The wireless device 104 may then determine one or more power settings 116 or a range of power settings 116 that may be used by the wireless device 104 in the region in which the wireless device 104 is operating. The wireless device 104 may select a power setting 116 from the stored power settings 116 that best matches the received region information 112 or would provide optimal performance of the wireless device 104 for the applicable region. The wireless device 104 may apply the selected power setting 116. Applying the selected power setting 116 may include changing the default power setting currently in use to the power setting 116 selected based on the received region information 112.

The wireless device 104 may join a network corresponding to the region information 112. In some configurations, joining the network may occur before applying a selected power setting 116, such as when the wireless device 104 communicates a discovery request and joins a network before applying a selected power setting 116 or adjusting a power setting 116 from the default power setting. Joining a network before applying a power setting 116 may prevent additional processing and may be easier to implement in some architectures of the system 100 for adjusting power settings of a wireless device 104.

In another configuration, the wireless device 104 may receive region information 112 and apply a power setting 116 before joining a network. Applying a power setting 116 before joining the network may prevent connection issues with a network and/or central configuration device 102. For example, where a wireless device 104 signal or output is not strong enough to connect to a central configuration device 102 at a lower power setting, applying a higher power setting based on region information may prevent issues with trying to join a network using inadequate power settings. Further, in an example where a broadcast is passively received or by where a broadcast is transmitted at regular intervals, one or more wireless devices 104 within range of a central configuration device 102 may self-configure power settings (e.g., radio power settings) without ever transmitting anything to the central configuration device 102. Another advantage to applying a power setting 116 before joining a network is that the wireless device 104 may join using adequate radio power for the region, resulting in a more reliable joining procedure in areas that allows a higher power setting 116. Further, in the approach where a power setting 116 is applied before joining a network (e.g., using a region code), the wireless device 104 includes the proper configuration if it 104 receives a valid region code. Further, all wireless devices 104 within range of the central configuration device 102 may self-configure a power setting 116 with a single radio transmission. This approach may be a relatively more complex solution.

It is also noted that a combination of configurations may be used with regard to applying a power configuration 116 before or after joining a network. In one configuration, a wireless device 104 may join a network using a low power setting 116 and then receive region information 112 (e.g., a region code). The wireless device 104 may then perform a self-lookup on the wireless device 104. In one example, the wireless device 104 may perform a self-lookup for a radio power (in decibels relative to one milliwatt (mW) or dBm, for example) configuration stored on the wireless device 104. In another configuration, one or more wireless devices 104 may be instructed via a broadcast to join a network according to a discrete radio power (e.g., every wireless device within a group may be instructed to change a power setting to −10 dBm) without joining the network.

Adjusting a power setting 116 based on region information 112 may enable a wireless device 104 to operate more efficiently and comply with region-specific regulatory requirements. Further, by storing power settings 116 associated with various regions on the wireless device 104, one or more wireless devices 104 may self-configure their power settings 116 based on a region in which the wireless device 104 is operating. This may improve the performance of the wireless device 104 without a need for manually adjusting a power setting 116 whenever a wireless device 104 operates in a new region. Also, by storing power settings 116 on the wireless device 104, the wireless device 104 is able to apply power settings 116 based on region information 112 dynamically or automatically in response to receiving region information 112. Furthermore, with the power settings 116 stored on the wireless device 104, a manufacturer may not need to produce different versions of the wireless device 104 for different regions and/or may not need to distribute different versions of the wireless device 104 for different regions.

Figure 2:
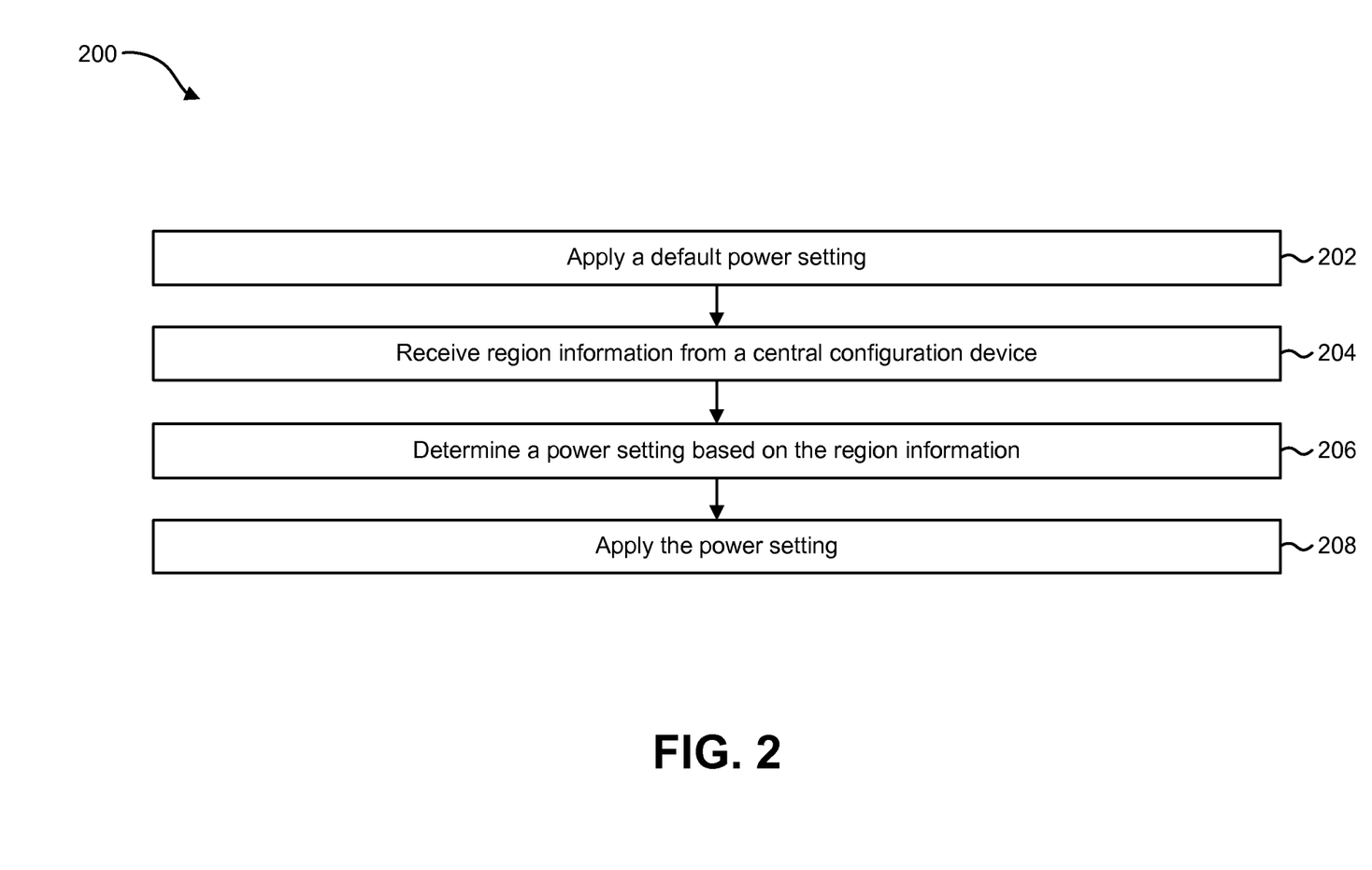
FIG. 2 is a flow diagram illustrating one configuration of a method for adjusting a power setting of a wireless device based on region information.

FIG. 2 is a flow diagram illustrating one configuration of a method 200 for adjusting a power setting 116 of a wireless device 104 based on region information 112. The method 200 may be performed by a wireless device 104.

A default power setting may be applied 202. The default power setting may be stored among various power settings 116 on the wireless device 104. The default power setting may be the lowest allowed power setting 116 of the wireless device 104. For example, the default power setting may be a lowest transmission power setting at which the wireless device 104 can communicate with another device and/or may be a transmission power setting that is low enough to comply with regulations in all of the regions in which the wireless device 104 may operate. The wireless device 104 may apply 202 the default power setting automatically when the wireless device 104 is initially activated (e.g., turned on). Additionally or alternatively, the default power setting may be applied automatically in response to detecting that the wireless device 104 has switched between different regions or locations having different regulatory requirements.

Region information 112 may be received 204 from a central configuration device 102. The region information 112 may correspond to an area or location in which the wireless device 104 is operating. The region information 112 may include various types of information, including latitude information, longitude information and/or a country code. Region information 112 may include additional or alternative region information or other information for providing an indication to the wireless device 104 about a region in which the wireless device 104 is operating. The wireless device 104 may determine a specific location or region of the wireless device 104 based on the received region information 112.

A power setting 116 based on the region information 112 may be determined 206. Determining 206 a power setting 116 may include selecting a power setting 116 from multiple power settings 116 stored on the wireless device 104. The stored power settings 116 may include a list of prepopulated power settings 116 on the wireless device 104. Each of the stored power settings 116 may be associated with one or more regions. A power setting 116 may be selected based on an associated region that matches or corresponds to region information 112 received by the wireless device 104.

The power setting 116 may be applied 208 to the wireless device 104. Applying 208 a power setting 116 may include instructing a wireless device 104 to operate according to different specifications associated with the selected power setting 116. For example, the wireless device 104 may operate according to a transmission power rating, a radio power setting or other power specification that may be used when operating the wireless device 104. Applying 208 the power setting 116 may include adjusting a power setting 116 of the wireless device 104 from the default power setting to the selected power setting 116 specific to a region in which the wireless device 104 is operating. Thus, the selected power setting 116 may be applied based on the region information 112 received from the central configuration device 102. The selected power setting 116 may be applied before or after joining a network.

Figure 3:
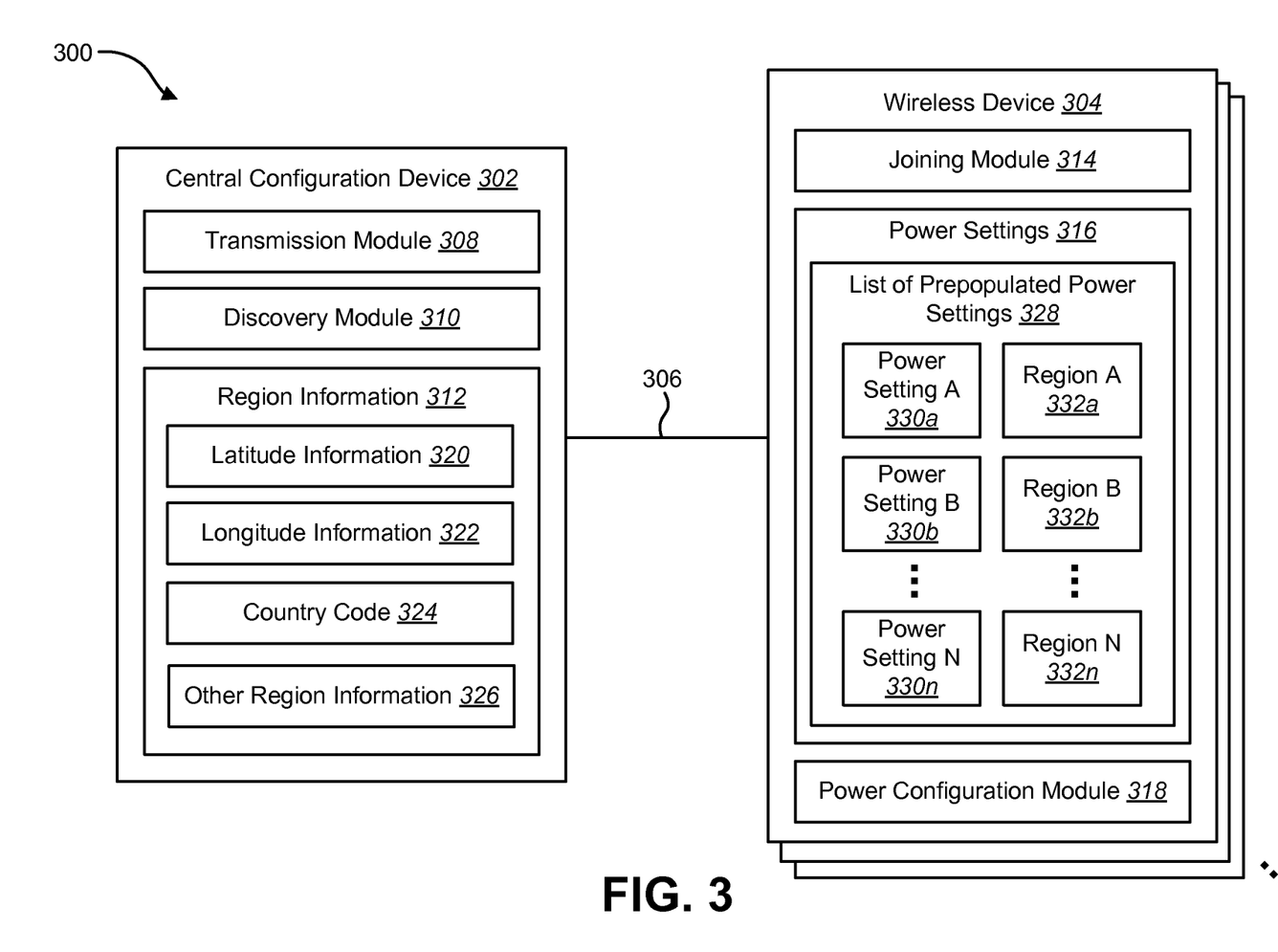
FIG. 3 is a block diagram illustrating a more detailed configuration of a system for adjusting a power setting of a wireless device based on region information.

FIG. 3 is a block diagram illustrating a more detailed configuration of a system 300 for adjusting a power setting 316 of a wireless device 304 based on region information 312. The system 300 may include one or more wireless devices 304 and a central configuration device 302 that communicate using a communication link 306. The central configuration device 302, wireless device 304 and communication link 306 may be similar to the central configuration device 102, wireless device 104 and communication link 106 described above in connection with FIG. 1.

The wireless device 304 may include a joining module 314 and a power configuration module 318. The joining module 314 and power configuration module 318 may include similar components and functionality as the joining module 114 and power configuration module 118 described above in connection with FIG. 1. The wireless device 304 may also include power settings 316. In one configuration, the power settings 316 may include a list of prepopulated power settings. The list of prepopulated power settings 328 may include a list of power settings 330 and associated regions 332.

In one example, the list of prepopulated power settings 328 includes power setting A 330a and power setting B 330b. Power setting A 330a may be associated with region A 332a. Power setting B 330b may be associated with region B 332b. The list of prepopulated power settings 328 may also include region information corresponding to region A 332a and region B 332b. The list of prepopulated power settings 328 may also store associations or links between each of the power settings 330 and corresponding regions 332. The list of prepopulated power settings 328 may include any number of power settings A-N 330a-n corresponding to any number of regions A-N 332a-n. Thus, if the wireless device 304 is operating in region A 332a, the wireless device 304 may determine that the optimal power setting would be power setting A 330a. Alternatively, if the wireless device 304 is operating in region B 332b, the wireless device 304 may determine that the optimal power setting would be power setting B 330b. The list of prepopulated power settings 328 may also include a default power setting (not shown).

In another configuration, the list of prepopulated power settings 328 may include multiple regions 332 associated with a power setting 330. Additionally or alternatively, multiple power settings 330 may be associated with a region 332. Further, when the wireless device 304 receives region information 312 from a central configuration device 302, the wireless device 304 may determine one or more power settings 316 based on the received region information 312. The wireless device 304 may then determine one or more power settings 316 that may be used when operating within a region 332 and further select a specific power setting 330 based on the region information 312 and/or other power considerations. Further, in an example where the list of prepopulated power settings 328 does not include a power setting 330 associated with a region in which the wireless device 304 is operating, the wireless device 304 may determine a power setting 330 that approximates power specifications or meets regulatory requirements of the region. Alternatively, the wireless device 304 may determine or select a default power setting if the list of prepopulated power settings 328 does not include a power setting 330 associated with a specific region 332.

The central configuration device 302 may include a transmission module 308 and a discovery module 310. The transmission module 308 and the discovery module 310 may include similar components and functionality as the transmission module 108 and discovery module 110 described above in connection with FIG. 1.

The central configuration device 302 may also include region information 312. The region information may include one or more types of information about a region in which the central configuration device 302 and/or wireless device 304 are operating. In one example, the region information 312 may include latitude information 320 and longitude information 322. The latitude information 320 and longitude information 322 may indicate an approximate location or geographic range of a network or indicate a more precise location of the central configuration device or the wireless device 304. The region information 312 may also include a country code 324. The country code 324 may be a numerical or alphabetic code for representing a country or region in which the wireless device 304 is operating. The region information 312 may optionally include other region information 326 particular to a region in which the wireless device 304 is located. For example, other region information 326 may include power specifications of a specific region, regulatory requirements by which electronic or computing devices operate within the region or other information that may be used by the wireless device 304 in determining a power setting 328 that may be applied to the wireless device 304.

Figure 4:
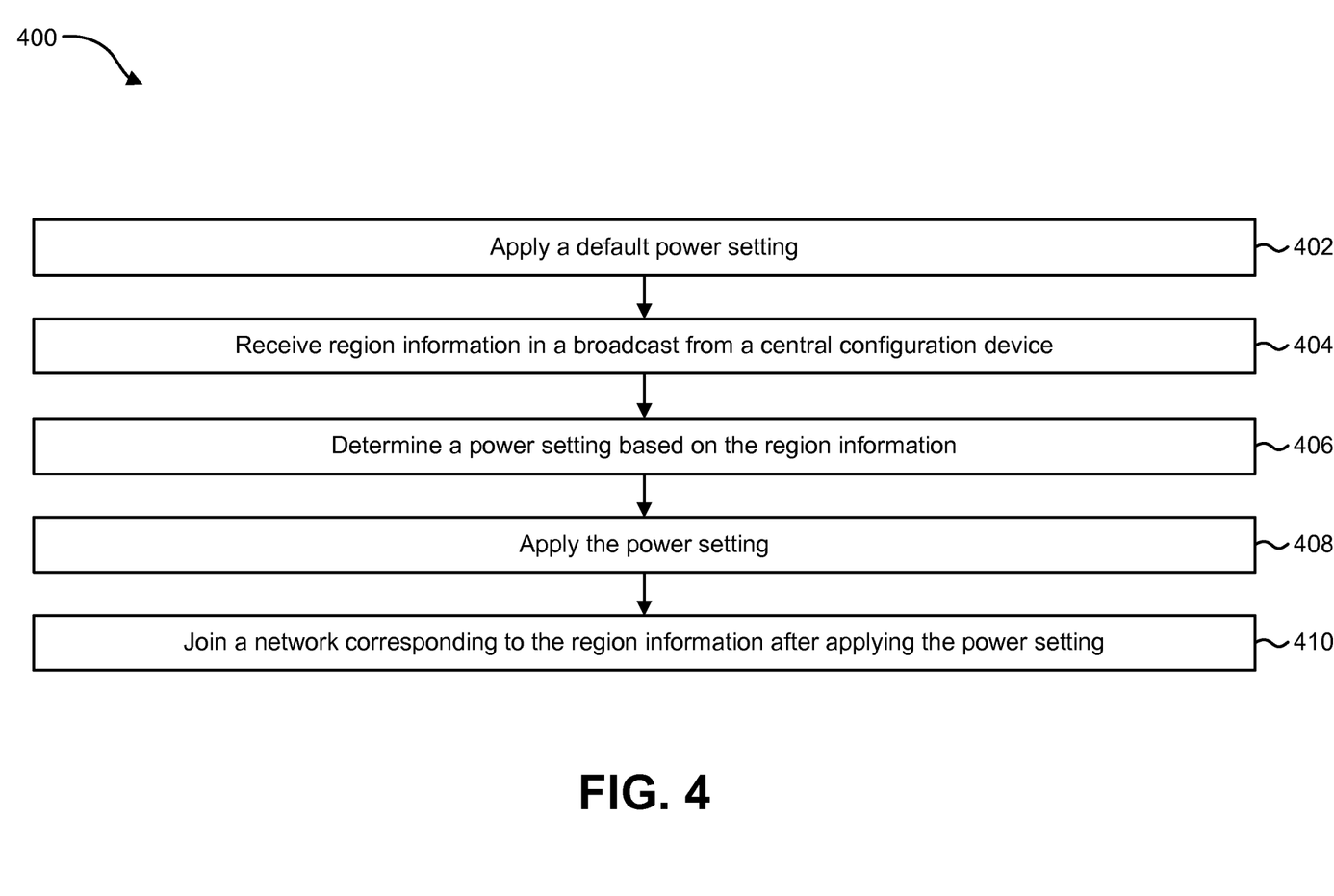
FIG. 4 is a flow diagram illustrating one configuration of a method for adjusting a power setting of a wireless device before joining a network.

FIG. 4 is a flow diagram illustrating one configuration of a method 400 for adjusting a power setting 116 of a wireless device 104 before joining a network. In one configuration, the method 400 may be performed by a wireless device 104.

A default power setting may be applied 402. This may be accomplished as described above in connection with one or more of FIGS. 1 and 2. The wireless device 104 may also receive 404 region information 112 in a broadcast from a central configuration device 102. This may be accomplished as described above in connection with one or more of FIGS. 1 and 2. In one configuration, the wireless device 104 may passively receive the region information 112 while un-joined and prior to joining a network within the region associated with the region information 112.

A power setting 116 based on the region information 112 may be determined 406. This may be accomplished as described above in connection with one or more of FIGS. 1 and 2. The wireless device 104 may apply 408 the power setting 116. This may be accomplished as described above in connection with one or more of FIGS. 1 and 2.

The wireless device 104 may join 410 a network corresponding to the region information 112 after applying the power setting 116. In other words, the wireless device 104 may receive 404 region information 112, determine 406 a power setting 116 and apply 408 the power setting 116 to the wireless device 104 before ever joining 410 a network within the region. Joining 410 the network after applying the power settings 116 may permit the wireless device 104 to be operating according to optimal power settings 116 before joining 410 a network. Therefore, the wireless device 104 need not determine optimal power settings 116 for a specific network while joined on that network. Further, dynamically applying a power setting 116 based on region information 112 may permit a wireless device 104 to operate more efficiently without requiring manual adjustment of the power settings 116 and permitting the wireless device 104 to operate more efficiently across multiple regions.

Figure 5:
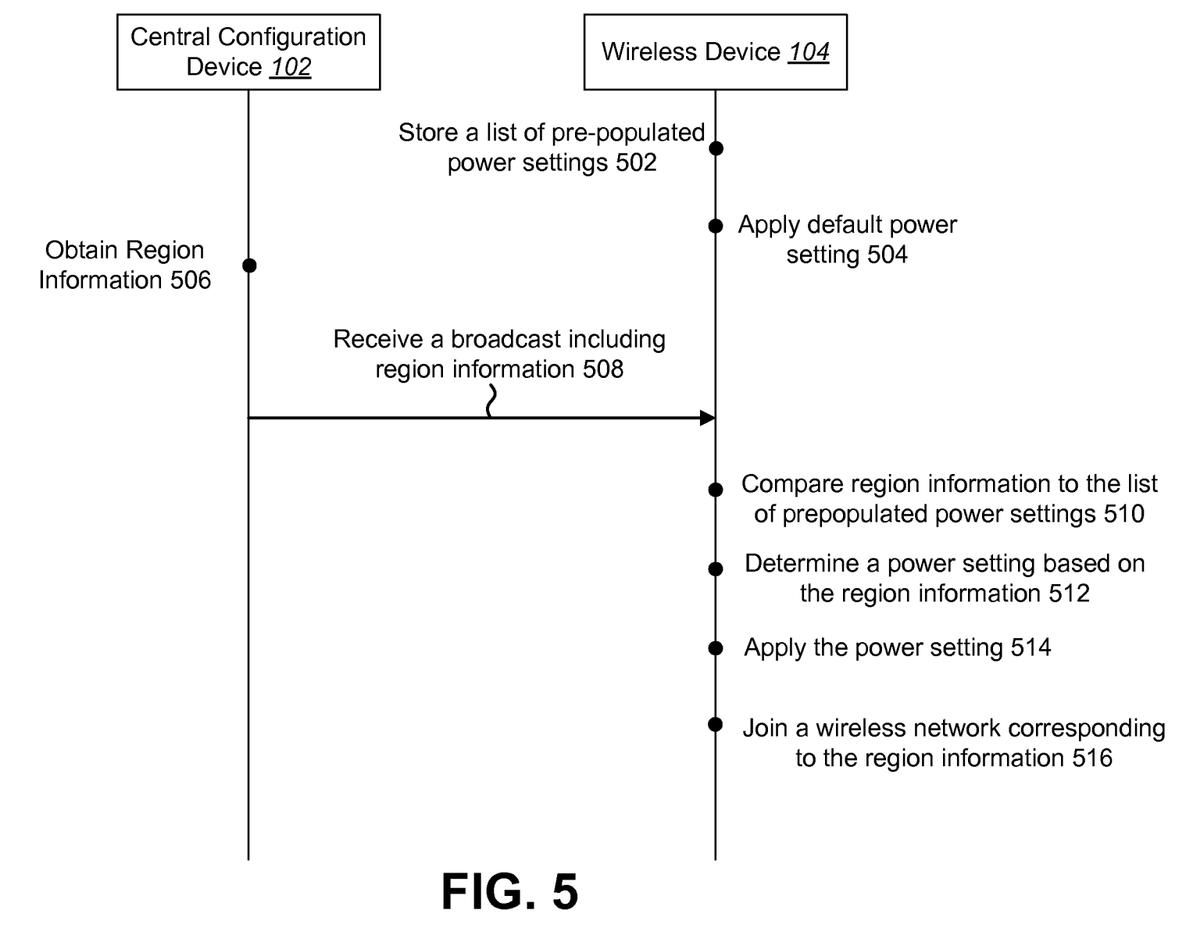
FIG. 5 is a thread diagram illustrating one example of a method for adjusting a power setting of a wireless device before joining a network.

FIG. 5 is a thread diagram illustrating one example of a method for adjusting a power setting 116 of a wireless device 104 before joining a network. A wireless device may store 502 a list of prepopulated power settings 328. The prepopulated list of power settings 328 may be stored when the wireless device 104 is initially manufactured and/or programmed. The list of prepopulated power settings 328 may also be stored (e.g., downloaded, input, etc.) on the wireless device 104 as information about region-specific power settings 116 or regulatory requirements of various regions become available.

The wireless device 104 may apply 504 a default power setting. The default power setting may be the lowest allowed power setting 116 of the wireless device 104. The central configuration device 102 may obtain 506 region information 112. Obtaining 506 region information 112 may include determining a region or location of the central configuration device 102, the wireless device 104 and/or a network that the wireless device 104 is trying to join. The central configuration device 102 may transmit the region information 112 to one or more wireless devices 104. In one example, transmitting region information 112 includes broadcasting the region information 112. The wireless device 104 may receive 508 a broadcast including region information 112 from the central configuration device 102.

The wireless device 104 may compare 510 the region information 112 to the list of prepopulated power settings 328. Comparing the region information 112 to the list of prepopulated power settings 328 may include comparing the region information 112 to a list of regions 332*a-n* stored on the wireless device 104 that correspond to each of a list of power settings 330*a-n*. The wireless device 104 may determine 512 a power setting 116 based on the region information 112. Determining 512 a power setting 116 may include selecting one of the list of prepopulated power settings 328 stored on the wireless device 104. The wireless device 104 may apply 514 the selected power setting 116 from the list of prepopulated power settings 328 to the wireless device 104. The wireless device 104 may then join 516 a wireless network corresponding to the region information 112 received by the central configuration device 102.

Figure 6:
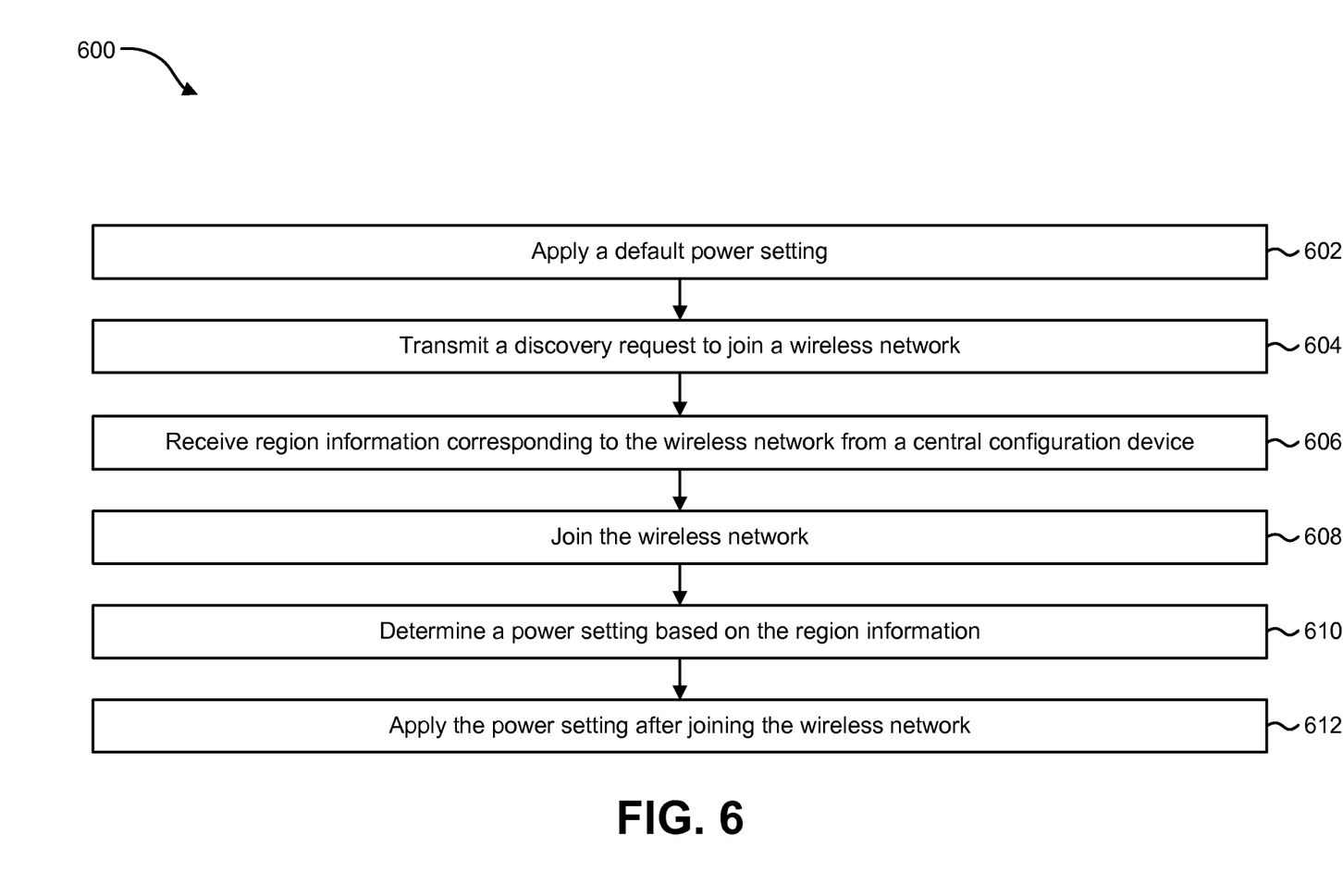
FIG. 6 is a flow diagram illustrating one configuration of a method for adjusting a power setting of a wireless device after joining a network.

FIG. 6 is a flow diagram illustrating one configuration of a method 600 for adjusting a power setting 116 of a wireless device 104 after joining a network. In one configuration, the method 600 may be performed by a wireless device 104.

A default power setting may be applied 602. This may be accomplished as described above in connection with one or more of FIGS. 1 and 2. The wireless device 104 may also transmit 604 a discovery request to join a wireless network. The discovery request may be sent to a base station or other central device that manages permission of one or more wireless devices 104 joining a network. In one configuration, the wireless device 104 may send the discovery request to a central configuration device 102. The discovery request may include an indication of a network the wireless device 104 has requested to join. In some configurations, the discovery request may further include location or region information about the wireless device 104.

The wireless device 104 may receive 606 region information 112 corresponding to the wireless network from the central configuration device 102. Receiving 606 the region information 112 may be in response to the central configuration device 102 receiving the discovery request from the wireless device 104. The wireless device 104 may join 608 the wireless network. Joining 608 the network may be via permission from a base station and/or central configuration device 102. The wireless device 104 may also join 608 the network using information received from the central configuration device 102 in addition to the region information 112.

A power setting 116 based on the region information 112 may be determined 610. This may be accomplished as described above in connection with one or more of FIGS. 1 and 2. Once a power setting 116 is determined, the wireless device 104 may apply 612 the power setting 116. This may be accomplished as described above in connection with one or more of FIGS. 1 and 2. The power setting 116 may be applied after joining the wireless network. Applying 612 the power setting 116 may include switching from the default power setting previously applied. In some configurations, the wireless device 104 may join the wireless network concurrently with receiving region information 112 and determining a power setting 116 based on the region information 112.

Figure 7:
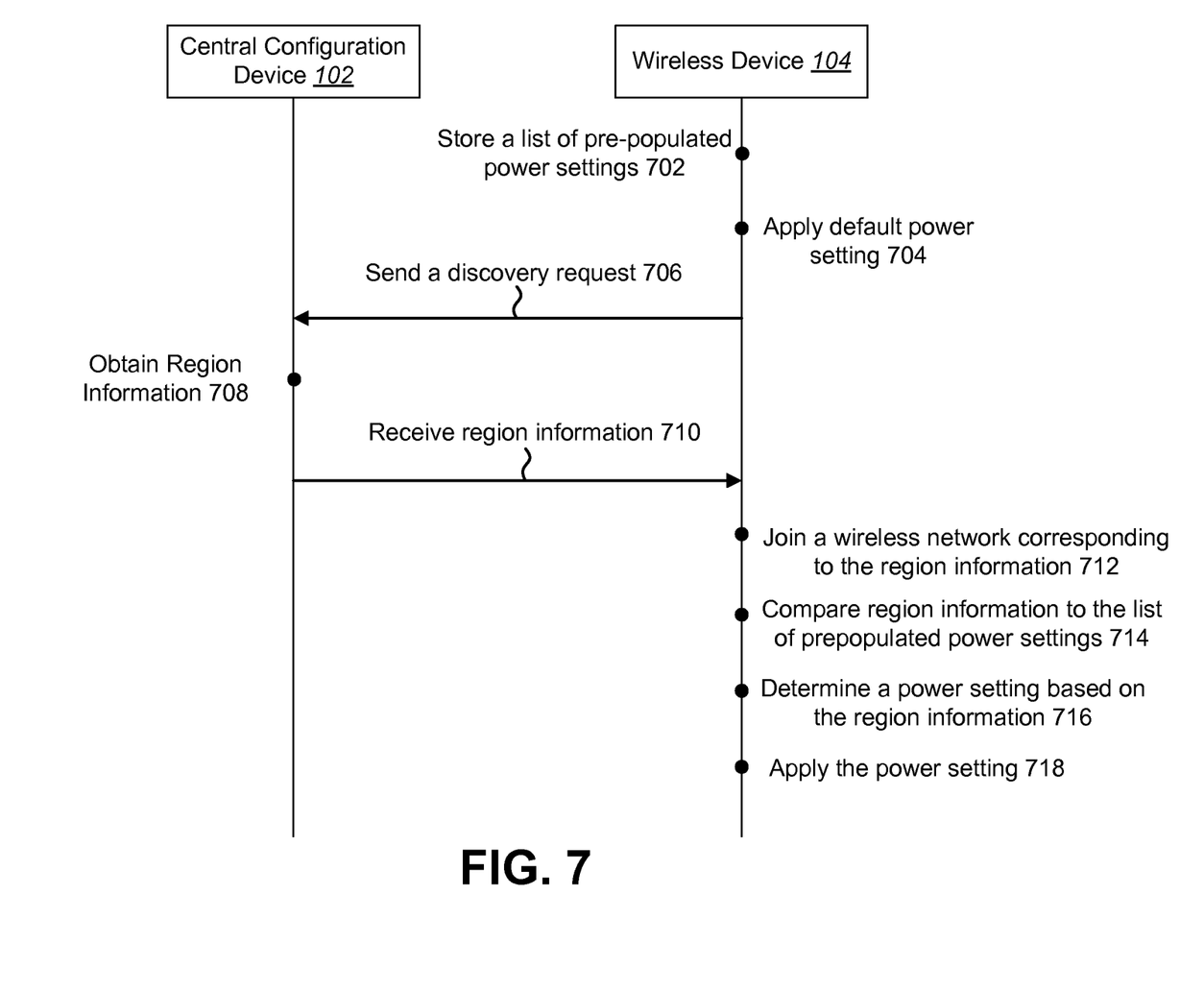
FIG. 7 is a thread diagram illustrating one example of a method for adjusting a power setting of a wireless device after joining a network.

FIG. 7 is a thread diagram illustrating one example of a method for adjusting a power setting 116 of a wireless device 104 after joining a network. A wireless device 104 may store 702 a list of prepopulated power settings 328. The list of prepopulated power settings 328 may be stored when the wireless device 104 is initially manufactured and/or programmed. The wireless device 104 may also apply 704 a default power setting. The default power setting may be applied upon startup of the wireless device 104 or when the wireless device 104 enters a new region. The wireless device 104 may send 706 a discovery request. The discovery request may be sent to the central configuration device 102. The central configuration device 102 may obtain 708 region information 112 corresponding to a region in which the wireless device 104 is operating. The central configuration device 102 may send region information 112 to the wireless device 104. The wireless device 104 may receive 710 the region information 112 from the central configuration device 102.

The wireless device 104 may then join 712 a network corresponding to the region information 112. Joining 712 the network may occur prior to applying any region-specific power settings 116 or switching from the default power setting. After joining the network, the wireless device 104 may compare 714 region information 112 to the list of prepopulated power settings 328. Using this comparison, the wireless device 104 may determine 716 a power setting 116 based on the region information 112. Determining 716 a power setting 116 may include selecting one of the list of prepopulated power settings 328 stored on the wireless device 104. The wireless device 104 may apply 718 the power setting 116 selected by the wireless device 104. Applying 718 the power setting 116 may include switching from the default power setting to the selected power setting 116. Applying 718 the power setting 116 may occur after the wireless device 104 joins the network corresponding to the region information 112.

Figure 8:
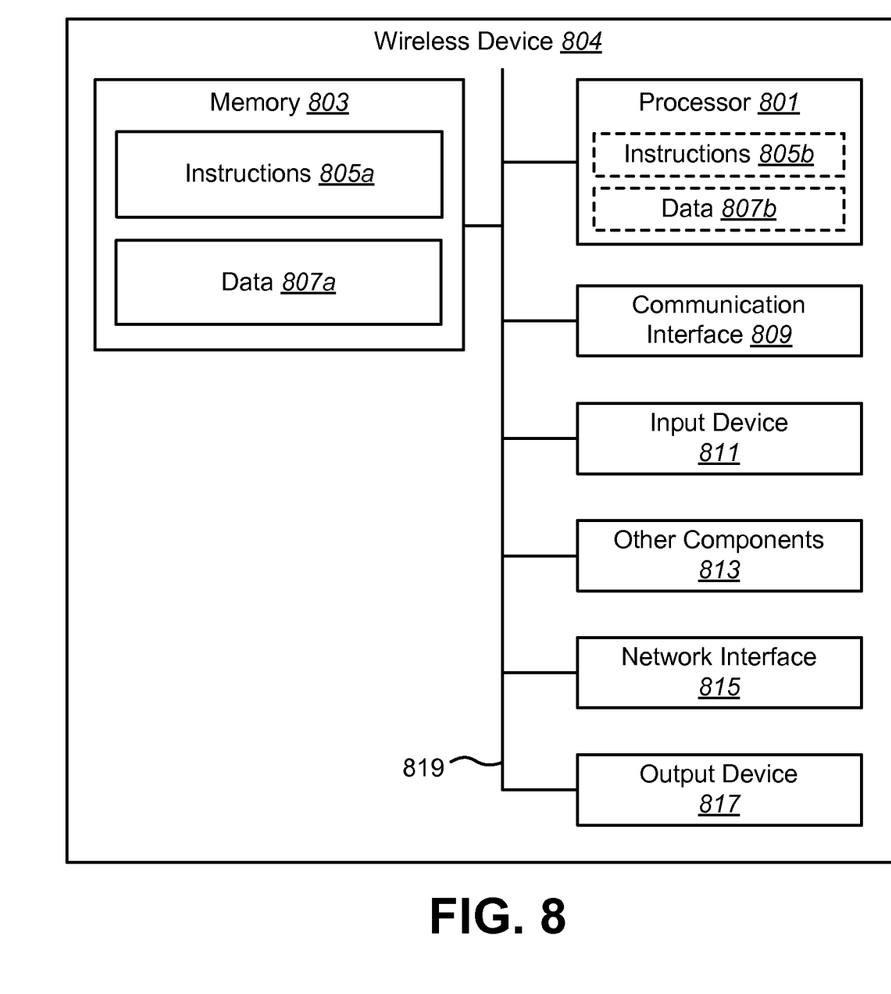
FIG. 8 is a block diagram illustrating various components that may be utilized in a wireless device.

FIG. 8 is a block diagram illustrating various components that may be utilized in a wireless device 804. One or more of the devices described herein may be implemented in accordance with the wireless device 804 described in connection with FIG. 8. Although only the wireless device 804 is shown, the configurations herein may be implemented in a system using many wireless devices. A wireless device 804 may include the broad range of digital computers, including microcontrollers, hand-held computers, personal computers, servers, mainframes, supercomputers, minicomputers, workstations and any variation or related device thereof. In some configurations, the wireless device 804 may be an appliance. Additionally or alternatively, the wireless device 804 may be an embedded device inside an otherwise complete device (e.g., within an appliance).

The wireless device 804 is shown with a processor 801 and memory 803. The processor 801 may control the operation of the wireless device 804 and may be embodied as a microprocessor, a microcontroller, a digital signal processor (DSP) or other device known in the art. The processor 801 typically performs logical and arithmetic operations based on program instructions 805*a* and/or data 807*a* stored within the memory 803. The instructions 805*a* in the memory 803 may be executable to implement the methods described herein. FIG. 8 illustrates instructions 805*b* and/or data 807*b* being loaded onto the processor 801. The instructions 805*b* and/or data 807*b* may be the instructions 805*a* and/or data 807*a* (or portions thereof) stored in memory 803.

The wireless device 804 may also include one or more communication interfaces 809 and/or network interfaces 815 for communicating with other computing and/or electronic devices. The communication interface(s) 809 and the network interface(s) 815 may be based on wired communication technology, and/or wireless communication technology, such as ZigBee®, WiMax®, WiFi®, Bluetooth® and/or cellular protocols, such as GSM®, etc.

The wireless device 804 may also include one or more input devices 811 and one or more output devices 817. The input devices 811 and output devices 817 may facilitate user input/user output. Other components 813 may also be provided as part of the wireless device 804.

Instructions 805a and data 807a may be stored in the memory 803. The processor 801 may load and execute instructions 805b from the instructions 805a in memory 803 to implement various functions. Executing the instructions 805a may involve the use of the data 807a that is stored in the memory 803. The instructions 805b and/or data 807b may be loaded onto the processor 801. The instructions 805 may be executable to implement one or more of the methods described herein, and the data 807 may include one or more of the various pieces of data described herein.

The memory 803 may be any electronic component capable of storing electronic information. The memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), an ASIC (Application Specific Integrated Circuit), registers, and so forth, including combinations thereof. The various components of the wireless device 804 may be coupled together by a bus system 819, which may include a power bus, a control signal bus and a status signal bus, in addition to a data bus. However, for the sake of clarity, the various buses are illustrated in FIG. 8 as the bus system 819.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of adjusting power settings on a wireless device, comprising:
    changing a transmission power setting to −10 decibels relative to one milliwatt (dBm) in response to receiving an instruction via a wireless broadcast to join a wireless network according to a discrete radio power;

transmitting a discovery request during a procedure for joining the wireless network;
receiving region information of a home automation controller, in a wireless transmission from the home automation controller, in response to transmitting the discovery request;
determining multiple power settings for a single region based on the received region information;
selecting a power setting from the multiple power settings for the single region; and
applying the power setting, wherein the wireless device joins the wireless network corresponding to the received region information before applying the power setting;
wherein the wireless device comprises a lighting dimmer.

2. The method of claim 1, wherein the discovery request is transmitted using a Z-wave protocol.

3. The method of claim 1, wherein region information comprises latitude information and longitude information.

4. The method of claim 1, wherein region information comprises a country code.

5. The method of claim 1, wherein the region information corresponds to a region in which the wireless device is operating.

6. The method of claim 1, wherein the wireless device comprises a list of prepopulated power settings.

7. The method of claim 6, wherein the wireless device comprises region information corresponding to each power setting on the list of prepopulated power settings.

8. The method of claim 6, wherein the wireless device comprises region information corresponding to a range of power settings.

9. The method of claim 6, wherein determining the multiple power settings comprises comparing the received region information to the list of prepopulated power settings.

10. The method of claim 6, wherein determining the multiple power settings comprises determining the multiple power settings from the list of prepopulated power settings based on the received region information.

11. A wireless device for adjusting power settings, comprising:
a processor;
memory in electronic communication with the processor; and
instructions stored in memory, the instructions being executable to:
change a transmission power setting to −10 decibels relative to one milliwatt (dBm) in response to receiving an instruction via a wireless broadcast to join a wireless network according to a discrete radio power;
transmit a discovery request during a procedure for joining the wireless network;
receive region information of a home automation controller, in a wireless transmission from the home automation controller, in response to transmitting the discovery request;
determine multiple power settings for a single region based on the received region information;
select a power setting from the multiple power settings for the single region; and
apply the power setting, wherein the wireless device joins the wireless network corresponding to the received region information before applying the power setting;
wherein the wireless device comprises a lighting dimmer.

12. The wireless device of claim 11, wherein the wireless device comprises a list of prepopulated power settings.

13. A non-transitory tangible computer-readable medium for adjusting power settings on a wireless device, the computer-readable medium comprising executable instructions for:
changing a transmission power setting to −10 decibels relative to one milliwatt (dBm) in response to receiving an instruction via a wireless broadcast to join a wireless network according to a discrete radio power;
transmitting a discovery request during a procedure for joining the wireless network;
receiving region information of a home automation controller, in a wireless transmission from the home automation controller, in response to transmitting the discovery request;
determining multiple power settings for a single region based on the received region information;
selecting a power setting from the multiple power settings for the single region; and
applying the power setting, wherein the wireless device joins the wireless network corresponding to the received region information before applying the power setting;
wherein the wireless device comprises a lighting dimmer.

* * * * *